US012688333B2

(12) United States Patent
Spizig et al.

(10) Patent No.: US 12,688,333 B2
(45) Date of Patent: Jul. 21, 2026

(54) METHOD FOR CHECKING DATA INTEGRITY

(71) Applicant: Robert Bosch GmbH, Stuttgart (DE)

(72) Inventors: Claus Spizig, Stuttgart (DE); Andreas Feder, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 180 days.

(21) Appl. No.: 18/336,490

(22) Filed: Jun. 16, 2023

(65) Prior Publication Data

US 2023/0418983 A1 Dec. 28, 2023

(30) Foreign Application Priority Data

Jun. 24, 2022 (DE) ..................... 10 2022 206 380.5

(51) Int. Cl.
*G06F 21/64* (2013.01)
*G06F 21/16* (2013.01)

(52) U.S. Cl.
CPC .............. *G06F 21/64* (2013.01); *G06F 21/16* (2013.01)

(58) Field of Classification Search
CPC ........ G06F 21/64; G06F 21/645; G06F 21/16; H04L 63/12; H04L 63/123; H04L 63/126
See application file for complete search history.

(56) References Cited

U.S. PATENT DOCUMENTS

| | | | | |
|---|---|---|---|---|
| 6,609,224 B1 * | 8/2003 | Jonsson | ................ | H04L 1/0041 |
| | | | | 714/776 |
| 8,160,293 B1 * | 4/2012 | Fridrich | ................ | G06V 40/40 |
| | | | | 713/194 |
| 8,959,155 B1 * | 2/2015 | Kwok | ................ | H04L 12/4633 |
| | | | | 709/205 |
| 2003/0202697 A1 * | 10/2003 | Simard | ................ | H04N 1/403 |
| | | | | 382/195 |
| 2015/0082435 A1 * | 3/2015 | Roussellet | ............. | G06F 21/64 |
| | | | | 726/23 |
| 2017/0317975 A1 * | 11/2017 | Olive | .................... | H04L 9/3247 |
| 2018/0068091 A1 * | 3/2018 | Gaidar | .................... | G06F 21/16 |
| 2020/0151345 A1 * | 5/2020 | Chauhan | ................ | G06F 21/16 |
| 2022/0131555 A1 * | 4/2022 | Hirao | ................ | H03M 13/6312 |

* cited by examiner

*Primary Examiner* — Malcolm Cribbs
(74) *Attorney, Agent, or Firm* — NORTON ROSE FULBRIGHT US LLP

(57) ABSTRACT

A method for checking data integrity when data are being transmitted in a vehicle. The method includes carrying out the following steps automatically: ascertaining the data at the vehicle; carrying out a preparation for the transmission of the ascertained data, in which at least one artificially generated and reproducible substitute portion is defined as an approximation of a data portion of the data by means of a piece of substitute information; carrying out the transmission of the data; carrying out the data integrity check on the transmitted data using the substitute information.

6 Claims, 3 Drawing Sheets

METHOD FOR CHECKING DATA INTEGRITY

CROSS REFERENCE

The present application claims the benefit under 35 U.S.C. § 119 of German Patent Application No. DE 10 2022 206 380.5 filed on Jun. 24, 2022, which is expressly incorporated herein by reference in its entirety.

FIELD

The present invention relates to a method for checking data integrity. The present invention also relates to a computer program and to a device for this purpose.

BACKGROUND INFORMATION

Various ways for ensuring data integrity are available in the related art. Often, a checksum calculation (e.g., a CRC) is used. Errors in the data transmission can be detected by recalculating this value on the receiver side and comparing it with the co-transmitted checksum.

However, when transmitting larger data such as video data, such a checksum calculation requires considerable computing power due to the large amounts of data and leads to additional energy consumption.

SUMMARY

The present invention relates to a method, a computer program, and a device for checking data integrity. Features and details of the present invention are disclosed herein. Of course, features and details described in the context of the method according to the present invention also apply in the context of the computer program according to the present invention and the device according to the present invention and respectively vice versa, so that mutual reference is or can always be made with respect to the disclosure of the individual aspects of the present invention.

The method of the present invention is used here to check data integrity when data is being transmitted, preferably in a vehicle. Data integrity refers in particular to an error-free and complete state of the data, in particular without manipulation or errors.

It is in particular provided according to an example embodiment of the present invention that the following steps be carried out automatically, preferably one after the other in the specified order and/or repeated:

ascertaining the data at the vehicle, for example by receiving the data as sensor data from a sensor of the vehicle, preferably an electronic image sensor, carrying out a preparation for the transmission of the ascertained data, in which at least or precisely one artificially generated and reproducible substitute portion is defined, preferably as an approximation of a data portion of the data, by means of a piece of substitute information and/or the substitute portion is produced and/or added to the data, carrying out the transmission of the data, in particular with the substitute information and/or the substitute portion, wherein the transmission preferably takes place from a decentralized zone controller and/or from the sensor to a central control unit of the vehicle, carrying out the data integrity check on the transmitted data using the substitute information; preferably carried out by the central control unit.

It is thus possible to detect errors in the transmission of the data by using the substitute information to check the data integrity. Since the substitute information is dependent on the originally ascertained data, the substitute information can be used to make an inference as to whether the data is corrupted after the transmission. The substitute information is a seed-key, for instance, that was ascertained by measuring a noise characteristic of a sensor used to ascertain the data. In this specific case, the seed-key can be used to generate a pseudo-noise that is very similar to the noise actually present in the ascertained data. In contrast to the real noise, the pseudo-noise can moreover be reproduced bit-identically using the substitute information. The pseudo-noise can then be added to, i.e., impressed on, the transmitted data if necessary. This can also be referred to as an injection of the reproducible pseudo-noise. If changes in the data occur during transmission, this can be detected on the receiver side by generating the pseudo-noise using the substitute information and removing the generated pseudo-noise from the transmitted data, e.g. using checking information such as at least one additional bit previously added to the data. In the case of an error-free transmission, it should be possible to remove the pseudo-noise correctly, otherwise an error or manipulation during the transmission would be detected. This can accordingly be used to check whether a change in the transmitted data becomes apparent.

In the context of an example embodiment of the present invention it can be provided that the preparation is carried out to prepare the data for data compression. The data portion of the data can be removed for this purpose, so that this can ultimately also be referred to as a lossy compression of the data. The data compression of the prepared data can be carried out prior to the transmission, wherein the transmitted data is then the data compressed by means of the data compression. When transmitting the compressed data, the substitute information can furthermore be transmitted instead of the removed data portion. The method according to the present invention can thus have the advantage that a synergy with the data compression is used when checking the data integrity. At high data rates, such as in a video transmission, the traditional methods for ensuring data integrity, e.g., a checksum calculation such as a CRC (cyclic redundancy check), require significant computing power. Using the synergy with the data compression makes it possible to accomplish this with significantly less computing power. An advantage can be achieved not only by reducing the amount of data by means of compression, but also by combining the data processing steps, on the one hand, in the data compression and, on the other hand, in the preparation for the transmission and/or in carrying out the data integrity check. Because it occurs during data compression, adding pseudo-noise to the transmitted data can provide synergy with the checking of the data integrity if the pseudo-noise is used for checking the data integrity as described in the context of the present invention.

In the context of the present invention it can further be provided that the data portion, in particular also referred to as the first data portion, is a noise portion of the data and the substitute portion is an artificially generated noise, in particular a pseudo-noise. If appropriate, the substitute portion can be defined by specifying the substitute information, in particular a seed-key for a random number generator. The substitute portion can thus be reproduced bit-identically after the transmission using the substitute information. For bit-identical reproduction, the substitute information, for example, is used by a generator, in particular a random number generator, to generate the substitute portion in the form of a two-dimensional matrix. The seed-key can be ascertained by measuring the noise characteristic of the (real) image sensor, for instance. The statistics of this pseudo-noise can therefore correspond to that which actually occurs in the image sensor, but are bit-identically reproducible.

According to an example embodiment of the present invention, not only the substitute portion can be reproduced bit-identically after the transmission using the substitute information, but it can also be provided that the data compressed by means of the data compression is reproduced bit-identically after the transmission. For this purpose, the data compression can be implemented in the form of lossless data compression. In combination with the preparation, however, a lossy data compression of the data can still result, because the first data portion is removed and the lossless data compression is applied only to the remaining portion of the data. "Bit-identical" is in particular understood to mean that each bit of data can be reproduced identically and thus without loss.

It can optionally be provided that the data is ascertained in the form of image data by at least one image sensor of the vehicle, wherein the substitute information and/or the substitute portion for the preparation is ascertained by ascertaining a noise characteristic of the at least one image sensor and/or by carrying out a noise evaluation of the ascertained image data in order to define the substitute portion in the form of a pseudo-noise as an approximation of the data portion. This makes it possible to add the pseudo-noise, because the pseudo-noise corresponds to the statistics of the image sensor and thus does not degrade the image information.

According to an example embodiment of the present invention, to check the data integrity, the ascertainment or the preparation can include the addition of checking information in order to be able to check said information after the transmission using the substitute information. In order to bundle the needed computing power, this addition can take place before or together with ascertaining and/or removing the data portion and/or adding the substitute information and/or the substitute portion and/or the data compression, for instance. Similarly, during the preparation, it is possible to add the checking information to the data and also remove the data portion and/or define an artificially generated and reproducible substitute portion as an approximation of the removed data portion by the substitute information and/or add the substitute information or the substitute portion to the data. It is also possible for the checking information to be added during the ascertainment, i.e. for the image data to be recorded in the image sensor, for instance, and combined with additional bits. The checking information can include additional bits, for example, preferably pixels, having a predefined value such as "0" at known locations of the data, preferably image data. The substitute portion, e.g. a pseudo-noise, can also be added after the checking information has been added to the data and consequently modify the checking information. If the pseudo-noise is generated again after the transmission and subtracted from the data, an error-free transmission can be detected if the checking information has thereby been reproduced identically. Alternatively or additionally, it is also possible that the checksums of the checking information or additional bits and/or the checking information and/or additional bits modified by the substitute portion after the addition of the substitute portion are known and evaluated after the transmission in order to detect an error-free transmission.

In other words, in the method according to an example embodiment of the present invention, ensuring the quality of the data can be enabled by embedding quality indicators in a compression procedure. The use of pseudo-noise, which corresponds statistically to that of the sensor being used but can be reproduced bit-identically via the seed-key, in particular allows the time-consuming checksum calculation to be simplified significantly or eliminated. It is thus possible to secure the transmission of the data against errors with less computational effort and thus with less energy consumption. The use of reproducible pseudo-noise also has the advantage that the receiver side can know in advance what values the checksums will have for specific bits. The values can thus be statically precalculated, so that the computational effort is further reduced. A possible combination with lossy compression procedures, which also work with an incorporation, in particular an addition, of pseudo-noise, thus results in an advantageous synergy.

The substitute portion can be an approximation of the data portion of the data. The data portion and the substitute portion can each be understood as a portion of the image recordings, which can represent a portion of each pixel. The data portion is a noise portion, for example. The data portion can then optionally be removed from the data. It can also be provided that a plurality of substitute portions are defined for the same data, e.g. for the data compression with a subsequent removal of the data portion on the one hand and, on the other hand, also for checking the data integrity, for which purpose the substitute portion is added to the data. In the context of the present invention, the reference to a substitute portion refers individually to one of the defined substitute portions or also to all substitute portions defined for the same data.

The described data compression also has the advantage that more, and also more relevant, data can be transmitted, even if the data connection used for this purpose is only a connection with a lower bandwidth. The data can be compressed to a much greater degree than is possible with many conventional methods. At the same time, corruption of the data can be avoided, because the first data portion is not merely removed, but rather a substitute portion is additionally provided as an approximation of the removed data portion.

The at least one substitute portion can be artificially generated and/or reproducible. This means that the substitute portion is not obtained from a modification or alteration of the removed data portion, but can rather be generated completely artificially using the substitute information, even without knowledge of the removed data portion. For this purpose, a generator such as a random number generator, for instance is used, which can generate the substitute portion, e.g. as a matrix or vector of random numbers, using the substitute information, e.g. a seed. In terms of data compression, this has the advantage that the substitute portion itself does not have to be transmitted, only the substitute information. If the substitute portion is transmitted to check the data integrity, for example, this has the advantage that a transmission error can be detected on the basis of the transmitted substitute portion. For this purpose, the transmitted substitute portion can be compared with the substitute portion generated again on the receiver side, for example. The substitute information can simply be a key such as a seed-key, and thus have a significantly smaller data size of a few bits compared to the substitute portion and the removed data portion. For instance, the substitute information has at most 1% the data size of the substitute portion and/or the removed data portion.

According to an example embodiment of the present invention, the data can preferably be embodied as image recordings, e.g. video data, and thus comprise a sequence of image data. The data compression has the advantage that the amount of data to be transmitted can be reduced. The first data portion can be a specific portion of the data, which can be characterized and selected according to predetermined and in particular statistical criteria. If the first data portion is removed, the prepared data can comprise only the portion of the data that remains after the removal. (In the context of this invention, the removed data portion is also referred to as the first data portion and the remaining portion is referred to as the second data portion). The remaining portion can comprise the relevant information content, e.g. a recording of a surroundings of the vehicle. The removed data portion, on the other hand, can comprise a lesser and predominantly random information content, e.g., representing only statistically distributed energy as noise.

According to an example embodiment of the present invention, in addition to defining and/or adding the substitute portion to the data for later checking of the data integrity, it is possible to also remove the first data portion in order to achieve improved data compression. Thus it is possible that a much higher degree of compression can be achieved by removing the first data portion, in particular the noise portion, of the data than would be the case with conventional methods. Since the removed first data portion can have a rather random and statistically distributed information content, compression would be possible only inefficiently. Due to the predominant random content of the removed data portion, it can instead be approximated statistically, thus enabling substitution with the artificially generated substitute portion. The data portion remaining after removal, on the other hand, cannot be statistically replicated due to the predominantly non-random information content, but, due to the extensive redundant information, is easier to compress. In other words, the ascertained data can consist of a random first data portion, in particular noise, and a second data portion with a high proportion of redundant information. If the data is embodied as image data, the first data portion can be the (superimposed) noise portion of the image, and the second data portion can be the remaining portion of the image after subtraction of the noise. This can also apply to each pixel of the image, which can consist of the first (random, noise) and the second (redundant) data portion. The, in particular lossless, data compression can be applied to the second (redundant) data portion. The first data portion, on the other hand, can be replaced by the substitute portion or one of the substitute portions, in particular based on a noise model.

In the context of the present invention, it can preferably be provided that carrying out the preparation comprises the following step:

replacing the data portion with the or at least one of the substitute portion(s) and/or adding the substitute portion or at least another one of the substitute portions to the transmitted data.

Optionally, it is also possible that ascertaining the data and/or carrying out the preparation comprises the following steps:

generating a defined checking information, in particular a reference bit and/or reference marker,
    adding the checking information to the data, in particular by replacing at least one or more defined pixels of the data, and then preferably incorporating, preferably adding, the substitute portion or at least one of the substitute portions to the data.

The checking information can thus be used, e.g. in the form of at least one co-transmitted additional bit, the content of which is known in advance, in particular to detect transmission errors after removal of the pseudo-noise. In addition to transmission errors, the method according to the present invention can also be used to detect undesirable, intentional modifications in the transmission. For this purpose, carrying out the data integrity check can further comprise the following steps:

reproducing the substitute portion using the substitute information,
    processing the data with the reproduced substitute portion, in particular including a subtraction of the substitute portion from the data, preferably only for the checking information,
    checking a change in the checking information in the processed data.

According to an example embodiment of the present invention, it is also advantageous if carrying out the preparation comprises at least one of the following steps:

introducing at least one watermark into the data, wherein the watermark is likewise transmitted during the transmission,
    introducing at least one piece of metadata information into the data, wherein the metadata information is likewise transmitted during the transmission.

The advantage of watermarking the data can be that the origin of the data can be traced. Furthermore, if pseudo-noise is impressed on the data, the watermarks can be not directly visible due to the pseudo-noise. Introducing metadata into the data can have the advantage that further processing steps (e.g. an annotation, describing what can be seen in the image) or the data can be marked as invalid for certain purposes (e.g. usable for training algorithms, but not for validating them).

It is also possible that carrying out the preparation comprises the following step:

introducing at least one piece of additional information into the data, wherein the additional information is likewise transmitted during the transmission.

According to one possibility, the additional information can include a reference marker or a reference bit as checking information. This can be processed when the data integrity check is carried out using the substitute information in order to detect manipulation and/or an error in the transmission. The additional information can also, for instance, include additional data that facilitates the assignment to data recorded at the same time in the same vehicle (e.g. information about a vehicle license plate number and/or a timestamp). It is also possible for field data to be introduced into the transmitted data via the additional information. This can be a temperature of an image sensor or the age of the image sensor, for example. Continuous counters can moreover also be introduced as additional information, for example to detect transmission gaps or failures of the data source such as the image sensor.

The present invention also relates to a computer program, in particular a computer program product, comprising instructions that, when the computer program is executed by a computer, prompt said computer program to carry out the method according to the present invention. The computer program according to the present invention thus brings with it the same advantages as have been described in detail with reference to a method according to the present invention.

The present invention furthermore relates to is a device for data processing for carrying out the method according to the present invention. The data processing device which executes the computer program can thus be provided as the computer, for example. The computer can comprise at least one processor for executing the computer program. A non-volatile data memory can also be provided, in which the computer program can be stored and from which the computer program can be read by the processor for execution. The device according to the present invention can also comprise a plurality of processors and/or be embodied as a computer system. The device according to the present invention can, for instance, comprise a central control unit of the vehicle and/or one or more decentralized zone controllers of the vehicle. The device according to the present invention can optionally also refer to the entire vehicle electronic system.

The present invention can also relate to a computer-readable storage medium which comprises the computer program according to the present invention. The storage medium is configured as a data memory such as a hard drive and/or a non-volatile memory and/or a memory card, for example. The storage medium can, for instance, be integrated in the computer.

The method according to the present invention can moreover also be configured as a computer-implemented method.

Further advantages, features, and details of the present invention will emerge from the following description, in which embodiment examples of the present invention are described in detail with reference to the figures. The features disclosed herein can each be essential to the present invention individually or in any combination.

DETAILED DESCRIPTION OF EXAMPLE EMBODIMENTS

In the following figures, the same reference signs are used for the same technical features even of different embodiment examples.

Figure 1:
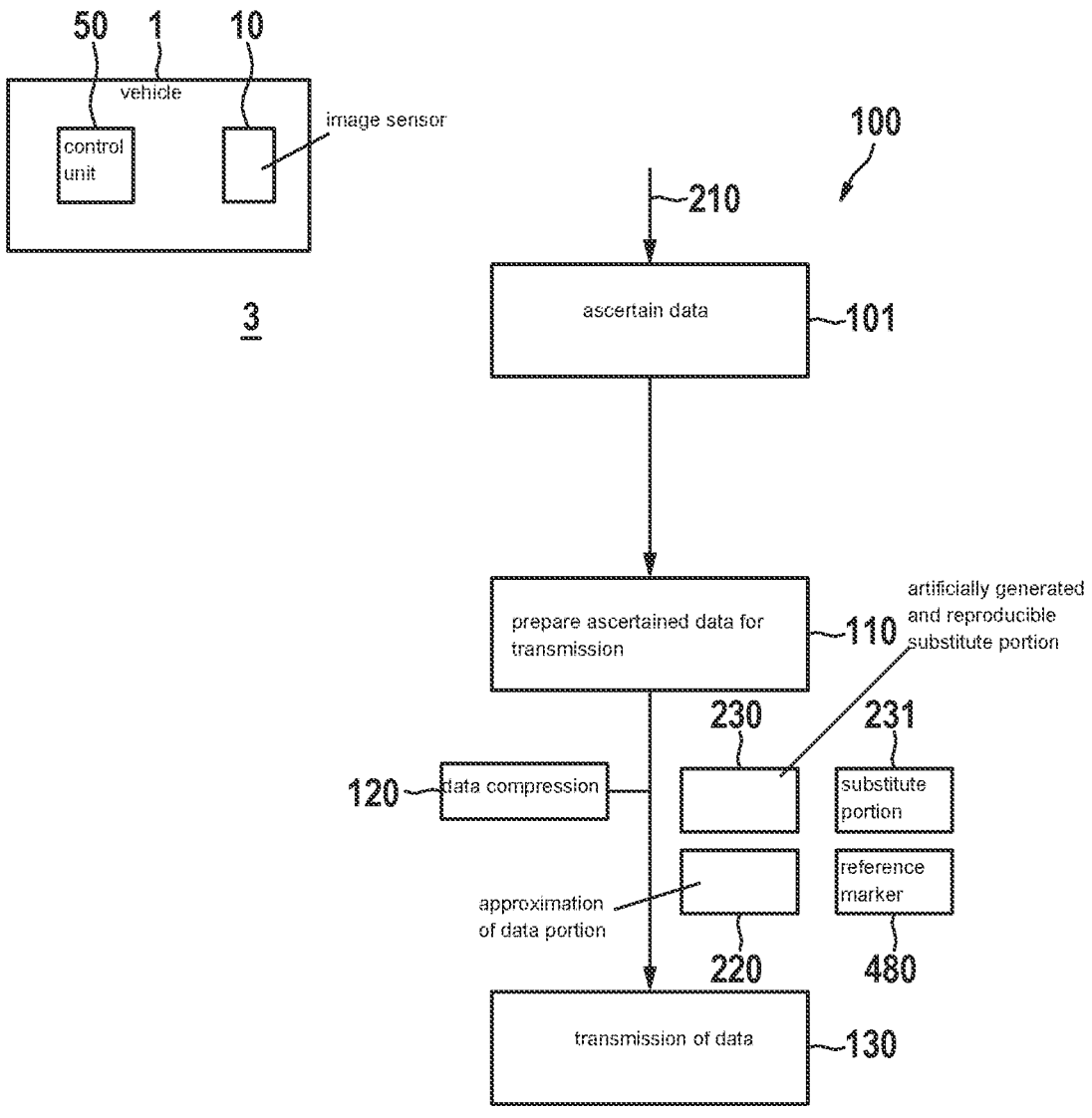
FIG. 1 shows a schematic illustration for visualizing a method according to an example embodiment of the present invention.

FIG. 1 visualizes a method 100 according to the present invention for checking data integrity when data 210 is being transmitted 130 in a vehicle 1. According to a first method step, the data 210 is ascertained 101 at the vehicle 1. For this purpose, the data 210 were acquired by an image sensor 10, for example, and then transmitted to a decentralized control unit 50, in particular a device 50 according to the present invention. According to a further method step, a preparation 110 for the transmission 130 of the ascertained data 210 is then carried out, in which at least one artificially generated and reproducible substitute portion 230 is defined as an approximation of a data portion 220 of the data 210 by means of a piece of substitute information 231. The transmission 130 of the data 210 can then be carried out. After the transmission, the data integrity check of the transmitted data 210 is carried out using the substitute information 231. The preparation 110 can optionally be carried out to prepare the data 210 for data compression 120, for which purpose the data portion 220 of the data 210 is removed.

Figure 2:
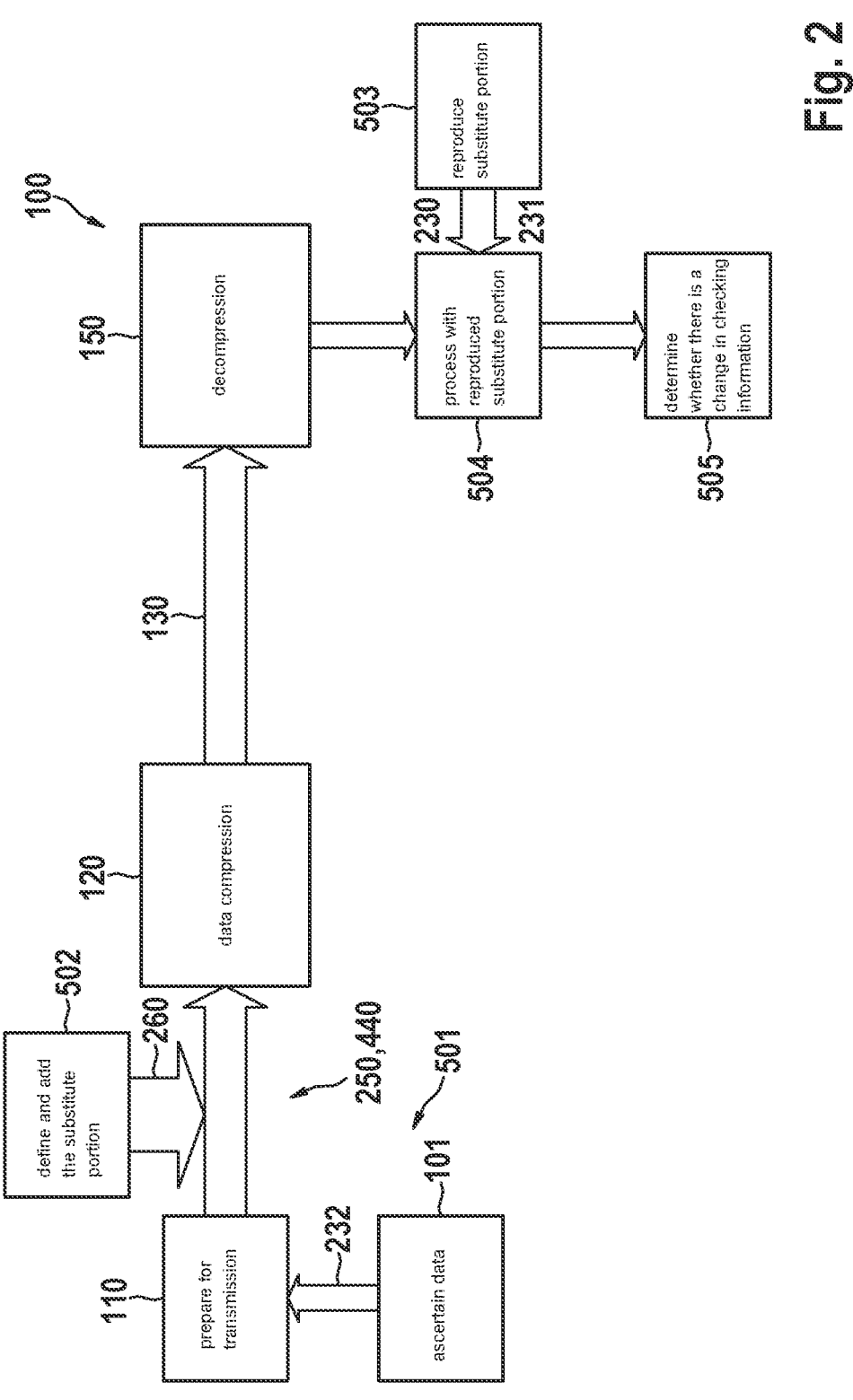
FIG. 2 shows a schematic illustration with further details for visualizing a method according to an example embodiment of the present invention.

FIG. 2 shows that a defined checking information 232 can be used to check the data integrity using the additional information 260. Ascertaining 101 the data 210 and/or carrying out the preparation 110 can include generating and adding 501 the checking information 232 to the data 210, in particular by replacing at least one or more defined pixels of the data 210. In each case, therefore, the checking information 232 can comprise at least one reference marker 480 and/or an additional bit, which replaces the corresponding pixel. The additional bit can have the value of 0, for example, and be introduced at specific locations of the data 230. Defining and adding 502 the substitute portion 230 to the data 210 can take place prior to the transmission. Reproduction 503 of the substitute portion 230 using the substitute information 231 can be provided after the transmission 130. The data 210 can then be processed 504 with the reproduced substitute portion 230, in particular by subtracting the substitute portion 230 from the data 230, preferably only for the additional bits. To subsequently carry out a data integrity check, a determination 505 can then be made as to whether there is a change in the checking information 232 in the processed data 210. This can be accomplished by evaluating the checksum of the checking information 232, for example.

Optionally, at least one watermark 250 and/or a piece of metadata information 440 can be introduced into the data 210 prior to the transmission 130. Data compression 120 and decompression 150 of the data 230 can furthermore take place before or after the transmission 130 as well.

Figure 3:
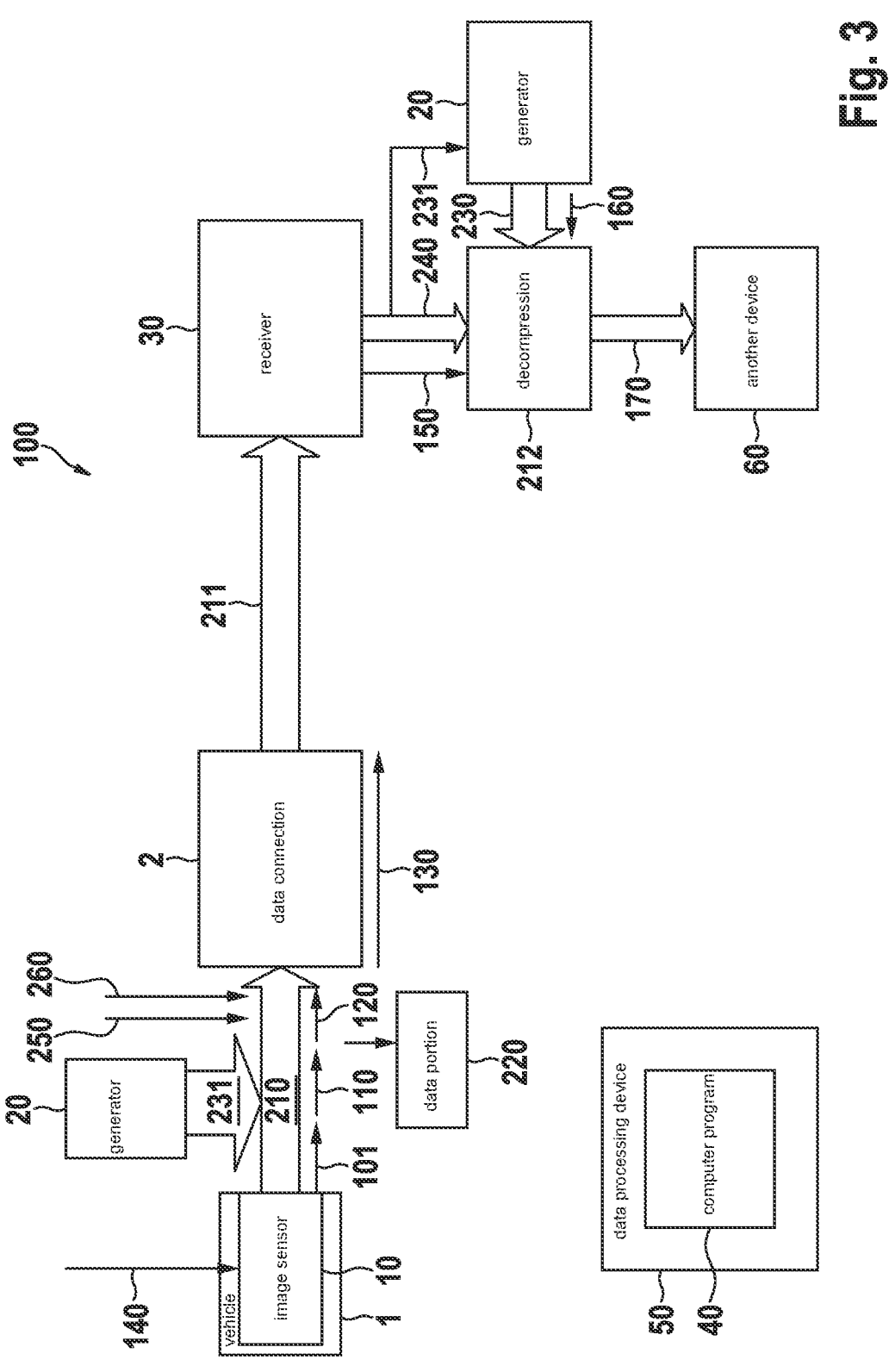
FIG. 3 shows a further schematic illustration with further example details for visualizing a method according to an example embodiment of the present invention.

FIG. 3 visualizes the steps of a method 100 according to the present invention for providing data 210 with further details. The image sensor 10, which can comprise a chip with a defined resolution, frame rate and noise characteristic, is shown as an example. The image sensor 10 in FIG. 3 also representatively stands for various image sensors 10 of the vehicle. Digital images ascertained by such image sensors 10 typically contain a high level of entropy, due in large part to sensor noise. The presence of this noise is an important aspect of what gives the image its natural statistical properties. Removing this noise can cause processing algorithms applied to the images, for example as part of a further processing 170, to produce different results than they would for an image that still contains this noise. The data 210 would therefore be corrupted. However, the presence of the noise severely limits the data reduction that can be achieved by lossless compression.

The following describes in more detail how higher compression rates can be achieved by using a substitute portion 230 while at the same time maintaining a realistic noise profile, so that content corruption can be avoided.

The image sensors 10 can be part of the vehicle 1 and carry out an acquisition 140 in a surroundings 3 of the vehicle 1 or on the vehicle 1 itself. The data 210 can be ascertained using said acquisition 140 and can, for instance, be sensor data, e.g. video data, output by the image sensors 10. The acquisition 140 can include a recording of content relevant to the functioning of the vehicle, in particular objects in the surroundings 3 of the vehicle 1. A vehicle function can furthermore be carried out by means of a processing 170 of the data 210.

According to a first method step, the data 210 is ascertained 101 at the vehicle 1. The data can be stored temporarily, for example after the acquisition 140, in order to transmit them at a later time when a data connection 2 is available. For this purpose, a detection of whether the data connection 2 is available can be carried out repeatedly, if necessary, in order to then initiate the method steps. For the transmission 130, a preparation 110 of the ascertained data 210 can be carried out, in which a data portion 220 of the data 210 is removed and an artificially generated and reproducible substitute portion 230 is defined as an approximation of the removed data portion 220 by means of a piece of substitute information 231 in order to prepare the data 210 for, in particular lossless, data compression 120. After the removal of the data portion 220, the data 210 can still include a remaining portion 240, which is especially suitable for lossless data compression 120. The removed data portion 220 can also be referred to as the first data portion 220 and the remaining portion 240 as the second data portion 240.

The step of preparing 110 can be carried out at least in part by a generator 20. This step can optionally also include adding further information to the data 210, e.g. additional information 260 and/or a watermark 250. The data compression 120 of the prepared data 210 can then be carried out, and the transmission 130 of the data 211 compressed by means of the data compression 120 can be initiated and/or carried out via the data connection 2. The removed data portion 220 is not transmitted in this process; instead of the data portion 220, the substitute information 231 is transmitted together with the remaining portion 240. The removed data portion 220 can be a noise portion 220 of the data 210 and the substitute portion 230 can be an artificially generated noise 230, in particular a pseudo-noise 230.

The substitute portion 230 can be defined in the preparation 110 by specifying the substitute information 231, in particular a seed-key for the generator 20 or a random number generator 20. The substitute information 231 can then be used to generate and thus reproduce the substitute portion 230, in particular after the transmission 130 and decompression 150 of the data 210. For the definition and/or generation 160 of the substitute portion 230, it can also be provided that the substitute portion 230 is generated in the form of a pseudo-noise 230 by an application of the generator 20. To enable a bit-identical reproduction of the substitute portion 230, the generator 20 can be configured with defined initial conditions, in particular as a function of a target noise model, referred to in short as the noise model. The initial conditions can be specified by substitute information 231 and transmitted.

FIG. 3 also shows a computer program 40 according to the present invention for carrying out the method steps and a data processing device 50 according to the present invention.

The removal of the data portion 220 can include removing most of the noise from the data 210, in particular the image data 210, e.g. by means of a noise reduction. Corrections, such as of sensor-specific noise, noise due to fixed patterns or uneven photosensitivity, can be carried out as well, if necessary. After this step, the prepared data 210, which can also be referred to as noise-reduced data 210, are obtained.

The generated pseudo-noise 230 can optionally be added to the noise-reduced data 210, in particular image data 210, at a later time, so that the resulting pseudo-noise image accurately mimics the desired noise model. The desired noise model can be suitable for mimicking the respective image sensor 10.

The prepared data 210 can be losslessly compressed and transmitted. In addition to a data content, the data 210 can optionally include the noise model with the at least one corresponding parameter (i.e. in particular the substitute information 231 or the seed-key), and preferably metadata and/or other additional information 260. The at least one parameter can be stored in the data 210 itself or in other data or a separate file using a steganographic key, for example.

The lossless compression can be carried out with a factor of 5 to 10, for example, preferably by means of a lossless codec defined in the JPEG2000 standard or a user-defined lossless codec. Examples include lossless JPEG or PNG compression or also ZIP compression. The at least one parameter of the pseudo-noise can optionally be stored with the compressed data 210. The decompression 150 can be accomplished by first decompressing the data 210 with the same lossless codec and then generating the pseudo-noise using the at least one parameter and adding it to the data 210.

An example design variant of the method steps according to the present invention will be described in more detail in the following. The ascertained data 210 can be embodied as image data 210 comprising a plurality of pixels i with the respective values $x_i$. Each pixel i can comprise the first data portion 220, i.e. the noise portion 220, and the remaining second data portion 240 with partially redundant information. This means that the two data portions 220, 240 can overlap. The removal of the first data portion 220 as part of the preparation 110 of the data 210 can be carried out using noise reduction, for example. Conventional noise-reduction techniques can be used for noise reduction. A noise model is typically used for this purpose. The prepared data 210 can then include only the remaining portion 240, and thus noise-reduced data 210. A Poisson-Gaussian model can be used as a noise model, for instance, for which the estimated standard deviation $\sigma_i$ of the pixel i with the value $x_i$ is given by $\sigma_i = \sqrt{a(x_i - x_0) + b}$. The noise parameters for this model in this case are a. These correlate in particular with the signal amplification in the image sensor 10. The black level of the image sensor 10 can be given as $x_0$. b can furthermore refer to a parameter that is associated with the read out noise of the image sensor 10. While this noise model is preferably suitable for CCD and CMOS raw image data, a simplified model can also be used, which assumes that the noise $\sigma_0$ has a standard deviation that is independent of the pixel value. In that case, the number of noise bits per pixel i for the image data 210 can be calculated with integer values as $N_{Bits} = \log_2 (\sigma_0 \sqrt{12}) = \log_2 (\sigma_0) + 1,792$. This number can be 6 to 8 bits, for example. The noise reduction techniques can then be used to ascertain a noise-reduced value $y_i$ for the respective values $x_i$ of the pixels i. A pseudo-random number generator 20 with a seed S, wherein S can be an integer, is used for this purpose, for example, in order to generate a pseudo-random number $R_i$ for each pixel i. The noise-reduced pixel values $y_i$ of the noise-reduced data 210 can, for example, be calculated by:

$$y_i = \left( \frac{x_i}{\frac{\sigma_0}{q}} + R_i \right).$$

The first data portion 220 is removed when the noise-reduced data 210 is generated by means of the noise reduction techniques. The first data portion 220 can accordingly indicate the difference between the originally ascertained data 210 and the prepared noise-reduced data 210. The first data portion 220 can comprise most of the natural noise in the ascertained data 210.

The substitute portion 230 can be defined after the data portion 220 is removed. The substitute portion 230 can be a pseudo-noise 230, which should come as close as possible to the removed noise. The substitute portion 230 can be generated using the substitute information 23, in the present example a seed-key. A target noise model can be used for this purpose. In the simplest case, the seed-key for this target noise model can be predefined arbitrarily and permanently stored for the method according to the present invention. Defining the substitute portion 230 therefore does not require an additional computational step. The seed-key can alternatively also be calculated using the removed data portion 220, e.g. by means of an optimization method for noise evaluation of the removed data portion 220. It is then possible to define a seed-key, which results in the substitute portion 230 coming as close as possible to the removed data portion 220. The seed-key can furthermore also be defined on the basis of the noise characteristic of the image sensor 10 in such a way that the substitute portion 230 generated therefrom comes as close as possible to the removed data portion 220. For this purpose, the seed-key can also be ascertained empirically or with the aid of a model.

The remaining portion 240 can then be compressed, in particular compressed losslessly, and the substitute information 23 can be transmitted to the receiver 30 together with the compressed remaining portion 240.

After the transmission 130, decompression 150 of the remaining portion 240 can be carried out first to obtain the decompressed data 212. The pseudo-noise 230 can then be reimpressed onto the remaining portion 240 using the transmitted substitute information 231, e.g. by calculating the pixel values $z_i$ as follows:

$$z_i = \mathrm{round}\left([y_i - R_i] \cdot \frac{\sigma_0}{q}\right).$$

This involves the use of a noise model and its parameters, wherein the noise model is the functional form of the transformation and the parameters are the exact values for $\sigma_0$ and q. The pseudo-random number $R_i$ can be calculated by the generator 20, which receives the transmitted substitute information 231 for random number generation for this purpose. The data 210 obtained in this manner with the pixel values $z_i$ come very close to the original ascertained data 210 and can then be transmitted to another device 60 for further processing 170.

The above explanation of the embodiments describes the present invention solely within the scope of examples. Of course, individual features of the embodiments can be freely combined with one another, if technically feasible, without leaving the scope of the present invention.

What is claimed is:

1. A method for checking data integrity when data are being transmitted in a vehicle, the method including the following steps are carried out automatically:

ascertaining the data at the vehicle;

carrying out a preparation for transmission of the ascertained data, in which at least one artificially generated and reproducible substitute portion is defined as an approximation of a data portion of the data using a piece of substitute information;

carrying out the transmission of the data; and carrying out the data integrity check on the transmitted data using the piece of substitute information, wherein the data portion is a noise portion of the data and the substitute portion is an artificially generated noise includes a pseudo-noise, wherein the substitute portion is defined by specifying the piece of substitute information and is a seed-key for a random number generator, wherein the substitute portion is reproduced bit-identically after the transmission using the piece of substitute information.

2. The method according to claim 1, wherein the data compressed using the data compression is reproduced bit-identically after the transmission wherein the data compression is carried out for as a lossless data compression.

3. A method for checking data integrity when data are being transmitted in a vehicle, the method including the following steps are carried out automatically:

ascertaining the data at the vehicle;

carrying out a preparation for transmission of the ascertained data, in which at least one artificially generated and reproducible substitute portion is defined as an approximation of a data portion of the data using a piece of substitute information;

carrying out the transmission of the data; and carrying out the data integrity check on the transmitted data using the piece of substitute information, wherein the data are ascertained in the form of image data by at least one image sensor of the vehicle, wherein the piece of substitute information and/or the substitute portion for the preparation is ascertained by ascertaining a noise characteristic of the at least one image sensor and/or by carrying out a noise evaluation of the ascertained image data in order to define the substitute portion in the form of a pseudo-noise as an approximation of the data portion.

4. A method for checking data integrity when data are being transmitted in a vehicle, the method including the following steps are carried out automatically:

ascertaining the data at the vehicle;

carrying out a preparation for transmission of the ascertained data, in which at least one artificially generated and reproducible substitute portion is defined as an approximation of a data portion of the data using a piece of substitute information;

carrying out the transmission of the data; and carrying out the data integrity check on the transmitted data using the piece of substitute information, wherein the ascertaining of the data and/or the carrying out of the preparation includes the following steps:

generating defined checking information;

adding the checking information to the data by replacing at least one or more defined pixels of the data;

wherein the carrying out the data integrity check includes the following steps:

reproducing the substitute portion using the piece of substitute information, processing the data with the reproduced substitute portion, checking a change in the checking information in the processed data.

5. A non-transitory computer-readable medium on which is stored a computer program for checking data integrity when data are being transmitted in a vehicle, the computer program, when executed by a computer, causes the computer to perform the following steps automatically:

ascertaining the data at the vehicle;

carrying out a preparation for transmission of the ascertained data, in which at least one artificially generated and reproducible substitute portion is defined as an approximation of a data portion of the data using a piece of substitute information;

carrying out the transmission of the data; and carrying out the data integrity check on the transmitted data using the piece of substitute information, wherein the data portion is a noise portion of the data and the substitute portion is an artificially generated noise includes a pseudo-noise, wherein the substitute portion is defined by specifying the piece of substitute information and is a seed-key for a random number generator, wherein the substitute portion is reproduced bit-identically after the transmission using the piece of substitute information.

6. A computer including one or more processors for data processing, wherein the one or more processors is configured for checking data integrity when data are being transmitted in a vehicle, the one or more processors configured to automatically:

ascertain the data at the vehicle;

carry out a preparation for transmission of the ascertained data, in which at least one artificially generated and reproducible substitute portion is defined as an approximation of a data portion of the data using a piece of substitute information;

carry out the transmission of the data; and carry out the data integrity check on the transmitted data using the piece of substitute information, wherein the data portion is a noise portion of the data and the substitute portion is an artificially generated noise includes a pseudo-noise, wherein the substitute portion is defined by specifying the piece of substitute information and is a seed-key for a random number generator, wherein the substitute portion is reproduced bit-identically after the transmission using the piece of substitute information.

* * * * *